(12) United States Patent
Huang et al.

(10) Patent No.: US 9,011,135 B2
(45) Date of Patent: Apr. 21, 2015

(54) FILM PATTERNING SYSTEM

(71) Applicants: Chen-Cheng Huang, Taipei (CN); Pao-Hao Huang, Taipei (CN); Pao-Han Huang, Taipei (CN)

(72) Inventors: Chen-Cheng Huang, Taipei (CN); Pao-Hao Huang, Taipei (CN); Pao-Han Huang, Taipei (CN)

( * ) Notice: Subject to any disclaimer, the term of this patent is extended or adjusted under 35 U.S.C. 154(b) by 102 days.

(21) Appl. No.: 13/736,573

(22) Filed: Jan. 8, 2013

(65) Prior Publication Data

US 2014/0193536 A1      Jul. 10, 2014

(51) Int. Cl.
*B29C 53/04*      (2006.01)
*B29C 59/04*      (2006.01)
*B29C 59/06*      (2006.01)

(52) U.S. Cl.
CPC .............. *B29C 53/043* (2013.01); *B29C 59/04* (2013.01); *B29C 59/06* (2013.01); *B29C 59/046* (2013.01)

(58) Field of Classification Search
CPC ............................ B29C 59/046; B29C 59/06
USPC .................................................. 425/367, 373
See application file for complete search history.

(56) References Cited

U.S. PATENT DOCUMENTS

| 5,458,477 | A | * | 10/1995 | Kemerer et al. | .............. 425/371 |
| 5,562,932 | A | * | 10/1996 | Rieker | ........................... 425/290 |
| 6,200,399 | B1 | * | 3/2001 | Thielman | ..................... 156/73.1 |
| 2007/0196601 | A1 | * | 8/2007 | Ray et al. | ..................... 428/34.1 |

* cited by examiner

*Primary Examiner* — Alison Hindenlang
(74) *Attorney, Agent, or Firm* — LeClairRyan

(57) ABSTRACT

A film patterning system includes: a first rotary member having a first shaft that defines a first axis, and a cylindrical first screen mold that is rotatable about the first axis; a second rotary member spaced apart from the first rotary member, having a second shaft that defines a second axis parallel to the first axis, and rotatable about the second axis; a second screen mold trained on the first and second rotary members and circumferentially stacked on the first screen mold; and a suctioning box mounted in the first rotary member for suctioning the film that is guided onto the second screen mold.

7 Claims, 6 Drawing Sheets

FILM PATTERNING SYSTEM

BACKGROUND OF THE INVENTION

1. Field of the Invention

This invention relates to a film patterning system, and more particularly to a film patterning system having screen molds that are circumferentially stacked one above the other.

2. Description of the Related Art

U.S. Patent Application Publication No. 2007/0196601 discloses a method of making a textured plastic film using a suction roll that includes cylindrical first and second screen elements that are co-axially disposed and that are stacked one above the other for texturing the plastic film guided onto the suction roll.

U.S. Pat. No. 4,543,299 discloses a suction roll or first rotary member having a laminated, seamless, cylindrical metal molding element for vacuum perforation of plastic films. The molding element includes two or more thin geometrically identical, seamless, cylindrical metal screens that are co-axially disposed and that are stacked and bonded together. Formation of the seamless cylindrical metal screens is complicated and expensive. For example, in one method, a mandrel is ground to a dimension corresponding to the desired dimension of the finished metal screen. A desired screen hole pattern is then engraved on the mandrel. A plating resist medium is applied to fill the engraved pattern. A nickel plating is subsequently conducted to form the desired metal screen. The metal screen thus formed is then removed from the mandrel.

In order to obtain a desired perforation pattern on the plastic film, the stacked metal screens are required to be in intimate contact with each other. For example, when two of the metal screens are co-axially disposed and are stacked one above the other, the outer one of the metal screens must have an inner diameter that is substantially equal to an outer diameter of the inner one of the metal screens. As such, a relatively high precision in making the metal screens is required, which results in difficulty in making the metal screens and an increase in manufacturing costs. In addition, assembling difficulties can arise when the metal screens are to be sleeved one over the other.

SUMMARY OF THE INVENTION

Therefore, the object of the present invention is to provide a film patterning system that can overcome the aforementioned drawbacks associated with the prior art.

According to the present invention, there is provided a film patterning system that comprises: a first rotary member having a first shaft that defines a first axis, and a cylindrical first screen mold that surrounds and that is coupled to the first shaft and that is rotatable about the first axis; a second rotary member spaced apart from the first rotary member, having a second shaft that defines a second axis parallel to the first axis, and rotatable about the second axis; a second screen mold trained on the first and second rotary members and circumferentially stacked on the first screen mold; and a suctioning box mounted in the first rotary member between the first shaft and the first screen mold for suctioning the film that is guided onto the second screen mold, thereby permitting the film to be patterned at least by the second screen mold.

BRIEF DESCRIPTION OF THE DRAWINGS

In drawings which illustrate embodiments of the invention.

DETAILED DESCRIPTION OF THE PREFERRED EMBODIMENTS

Figure 1:
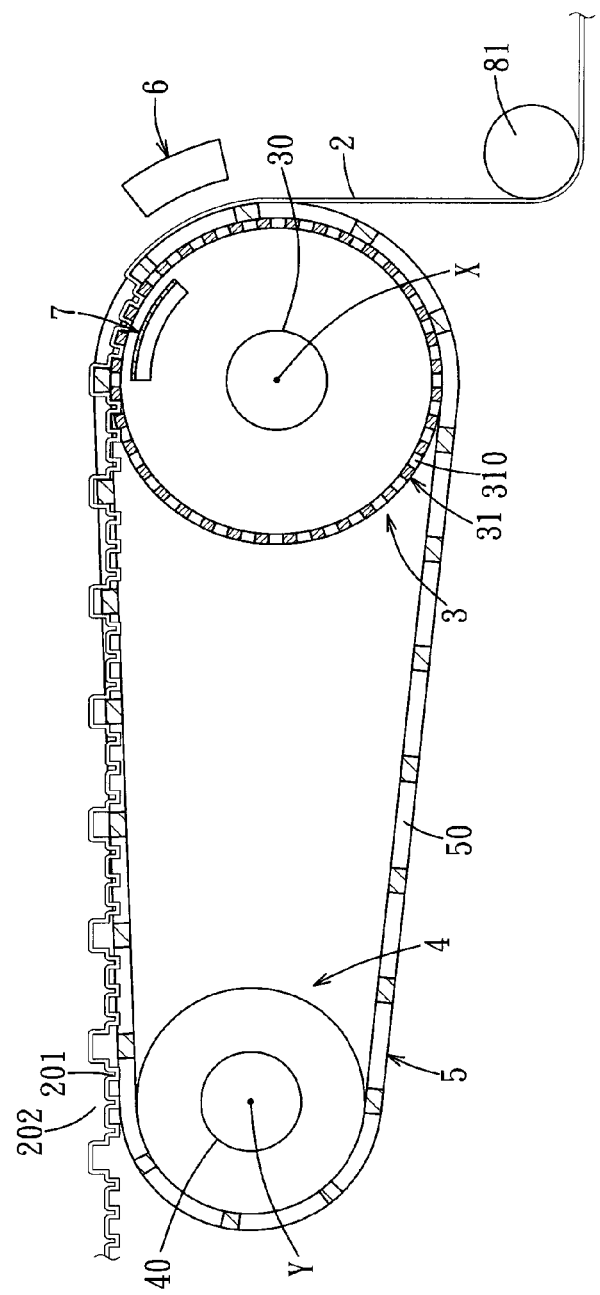
FIG. 1 is a schematic view of the first preferred embodiment of a film patterning system according to the present invention.

Before the present invention is described in greater detail with reference to the accompanying preferred embodiments, it should be noted herein that like elements are denoted by the same reference numerals throughout the disclosure.

Figure 2:
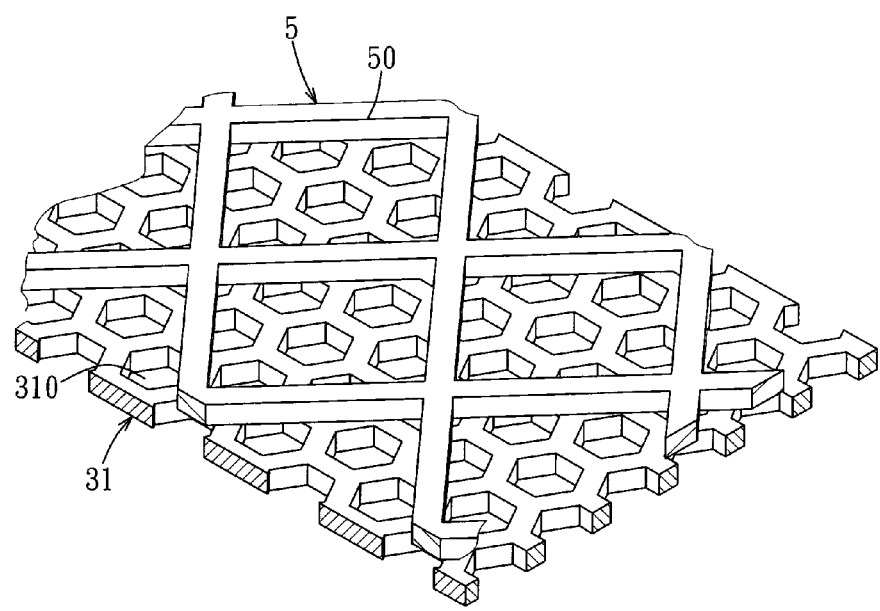
FIG. 2 is a fragmentary perspective view of first and second screen molds of the first preferred embodiment.

FIGS. 1 and 2 illustrate the first preferred embodiment of a film patterning system for patterning a plastic film 2 according to the present invention. The pattern formed in the plastic film 2 can be a hole pattern or an embossed pattern. The film patterning system includes: a first rotary member 3 having a first shaft 30 defining a first axis (X), two first mounting frames (not shown) coupled to two opposite ends of the first shaft 30, respectively, and a cylindrical or circular loop-shaped first screen mold 31 that surrounds coaxially and that is coupled to the first shaft 30 through the first mounting frames, and that is rotatable about the first axis (X); a second rotary member 4 spaced apart from the first rotary member 3, including a second shaft 40 defining a second axis (Y) and a second mounting frame (not shown) coupled to the second shaft 40, and rotatable about the second axis (Y) that is parallel to the first axis (X); a loop-shaped second screen mold 5 trained on the first and second rotary members 3, 4 through the first and second mounting frames and circumferentially stacked on the first screen mold 31; a heater 6 disposed adjacent to the first rotary member 3 for heating and softening the plastic film 2 that is guided onto the second screen mold 5 and that is disposed in the vicinity of the heater 6; and a suctioning box 7 mounted in the first rotary member 3 between the first shaft 30 and the first screen mold 31 for suctioning the plastic film 2 that is guided onto the second screen mold 5 and that is disposed in the vicinity of the suctioning box 7, thereby permitting the plastic film 2 to be patterned at least by the second screen mold 5 to form a patterned plastic film 2. Each of the first and second screen molds 31, 5 is made from metal and is seamless. Alternatively, the first and second screen molds 31, 5 may be made from heat-resistant plastics, or one of the first and second screen molds 31, 5 may be made from metal and the other may be made from the heat-resistant plastics.

Figure 3:
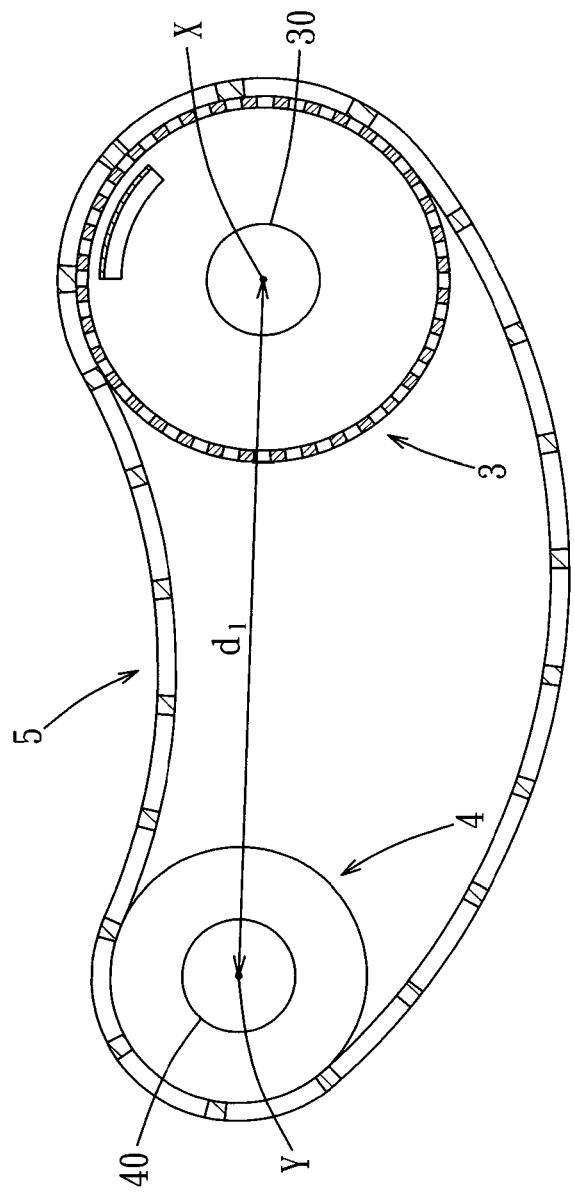
FIG. 3 is a schematic view illustrating amounting state where first and second rotary members of the first preferred embodiment are disposed at a relative position to facilitate mounting of a screen mold on the first and second rotary members.
Figure 4:
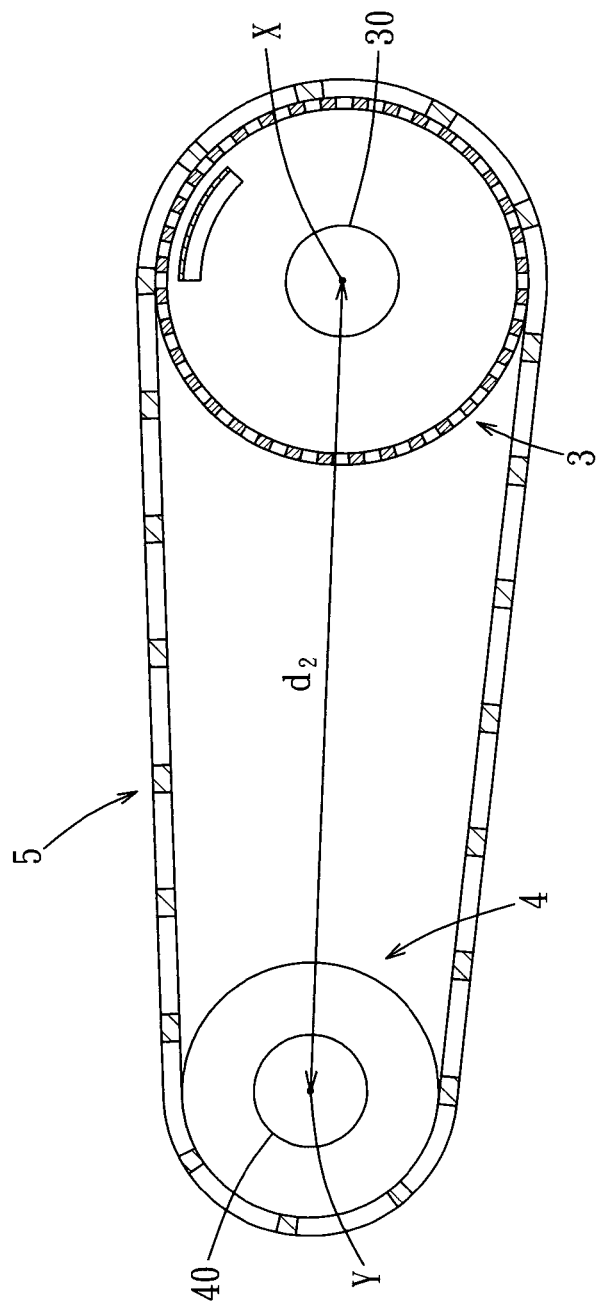
FIG. 4 is a schematic view illustrating a tightening state where the first and second rotary members of the first preferred embodiment are disposed at another relative position to permit the screen mold to be tightly trained on the first and second rotary members.

In order to facilitate mounting and permit the second screen mold 5 to be tightly trained on the first and second rotary members 3, 4, the first and second rotary members 3, 4 are preferably adjustable in relative position such that the distance between the first and second axes (X, Y) is adjustable. FIG. 3 illustrates a mounting state where the second screen mold 5 is loosely trained on the first and second rotary members 3, 4 and where the distance between the first and second axes (X, Y) is $d_1$. FIG. 4 illustrates a tightening state where the second screen mold 5 is tightly trained on the first and second rotary members 3, 4 and where the distance between the first and second axes (X, Y) is $d_2$ which is greater than $d_1$. The adjustable function in relative position between the first and second rotary members 3, 4 not only facilitates the mounting of the second screen mold 5 but also eliminates the aforesaid drawback of the prior art that requires relatively high precision in making the metal screens.

At least one of the first and second rotary members 3, 4 is coupled to and is driven by a motor (not shown) so that the first and second rotary members 3, 4 can rotate about the first and second axes (X, Y), respectively, upon rotation of the motor.

The pattern formed in the plastic film 2 can be a perforation-type (through-hole) pattern or a recess-type (non-through-hole) pattern according to actual requirements. In addition, the plastic film 2 can be simultaneously patterned by the first and second screen molds 31, 5. For example, the plastic film 2 can be perforated or indented to form a plurality of recesses 201 with a pattern corresponding to that of screen holes 310 of the first screen mold 31, and a plurality of openings 202 with a pattern corresponding to that of screen holes 50 of the second screen mold 5.

In operation, the plastic film 2 is delivered from a film supplying unit (not shown), and is guided by a guiding roller 81 to a portion of the second screen mold 5 that is stacked on the first screen mold 31. The plastic film 2 together with the portion of the second screen mold 5 is subsequently advanced toward a vicinity of the heater 6 and the suctioning box 7 by rotation of the second screen mold 5 together with the first and second rotary members 3, 4 so as to be heated by the heater 6 and sucked into the screen holes 310 of the first screen mold 31 and the screen holes 50 of the second screen mold 5 by a suctioning action of the suctioning box 7, thereby patterning the plastic film 2. The patterned plastic film 2 together with the portion of the second screen mold 5 is further advanced by rotation of the second screen mold 5, and is released from the first screen mold 31 when the portion of the second screen mold 5 leaves the first screen mold 31. As such, subsequent release of the patterned plastic film 2 from the second screen mold 5 can be facilitated.

Figure 5:
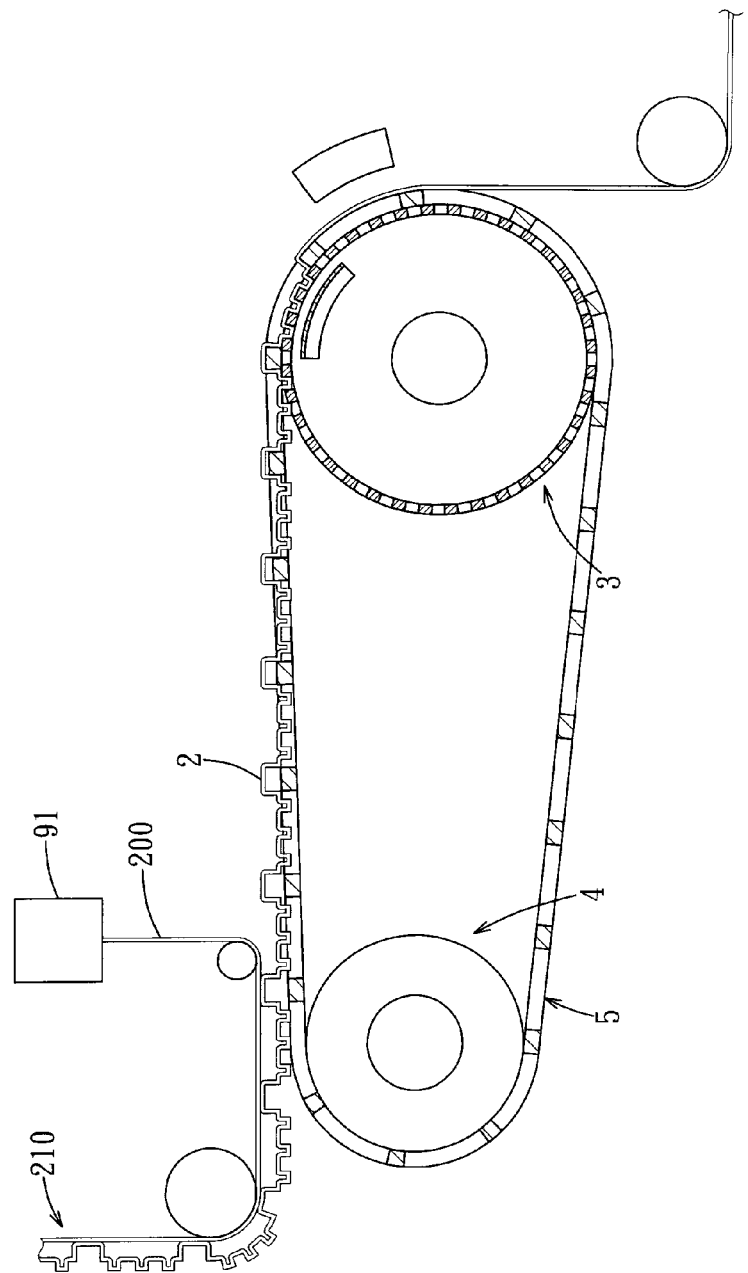
FIG. 5 is a schematic view of the second preferred embodiment of a film patterning system according to the present invention.

FIG. 5 illustrates the second preferred embodiment of the film patterning system according to the present invention. The second preferred embodiment differs from the previous embodiment in that the film patterning system of the second preferred embodiment further includes an extruder 91 for forming and casting a plastic backsheet 200 over the patterned plastic film 2 on the second screen mold 5 so as to form a web 210 including an assembly of the patterned plastic film 2 and the backsheet 200 bonded to the patterned plastic film 2.

The aforesaid embodiments may be modified in a manner that the second rotary member 4 includes an additional screen mold (not shown) which is cylindrical in shape and which surrounds an axis of the second rotary member 4, and a suctioning box (not shown) mounted therein and that an additional heater (not shown) is disposed adjacent to the second rotary member 4 so that the plastic film 2 can be further patterned by an assembly of the second screen mold 5 and the additional screen mold.

Figure 6:
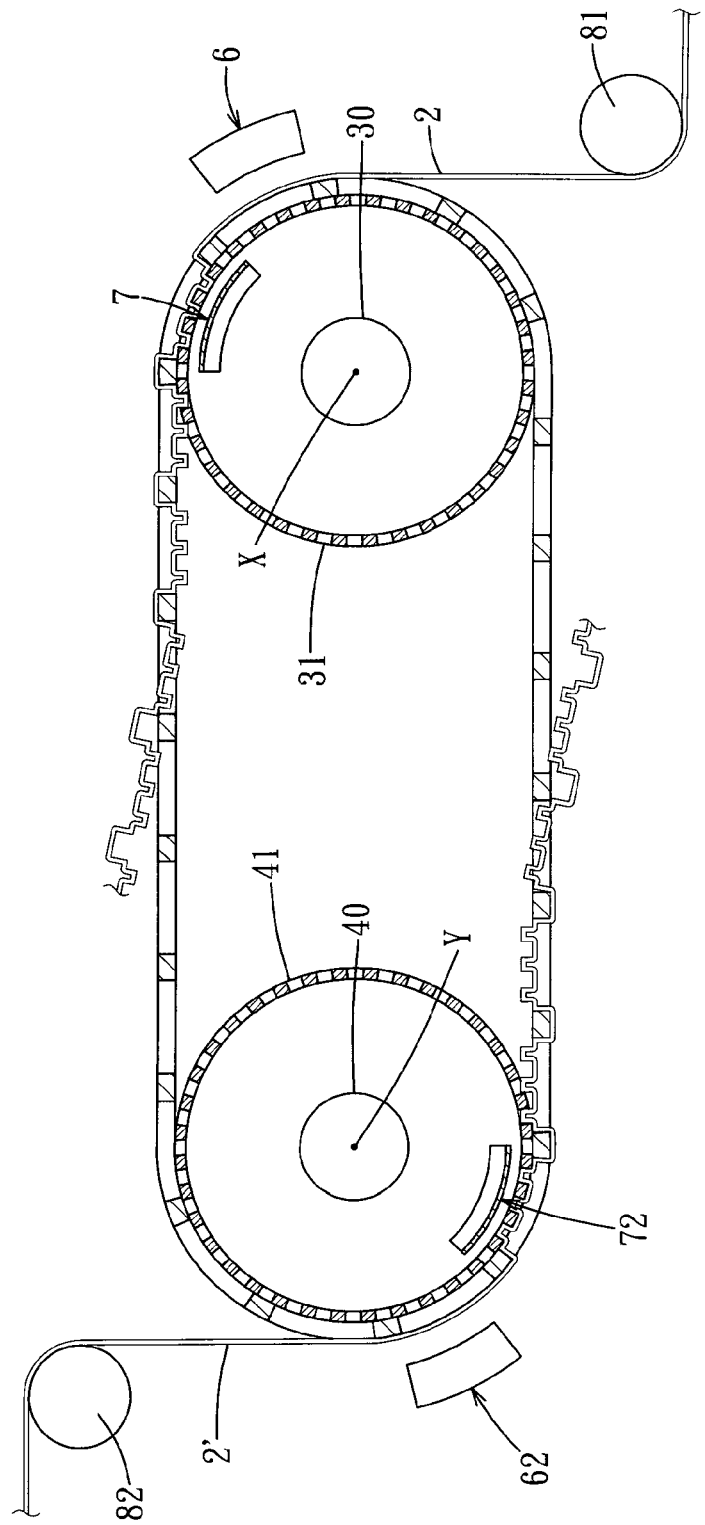
FIG. 6 is a schematic view of the third preferred embodiment of a film patterning system according to the present invention.

FIG. 6 illustrates the third preferred embodiment of the film patterning system according to the present invention. The third preferred embodiment differs from the first preferred embodiment in that the third preferred embodiment further includes a second guiding roller 82, a second suctioning box 72 and a second heater 62 and in that the second rotary member 4 further has a cylindrical third screen mold 41. In this embodiment, the third screen mold 41 surrounds and is coupled to the second shaft 40 through a pair of frames (now shown), and is rotatable about the second axis (Y). The second screen mold 5 is circumferentially stacked on the third screen mold 41. The second suctioning box 72 is mounted in the second rotary member 4 between the second shaft 40 and the third screen mold 41. The second guiding roller 82 guides a second film 2' onto the second screen mold 5. The second heater 62 is disposed adjacent to the second rotary member 4 for softening the second film 2' so that the second film 2' can be patterned by the second and third screen molds 5, 41 while being sucked by the second suctioning box 72. The third screen mold 41 can have a structure different from or the same as that of the first screen mold 31. When the structure of the third screen mold 41 is the same the rate of the first screen mold 31, the film patterning rate of the third preferred embodiment can be twice of that of the first preferred embodiment.

By mounting the first screen mold 31 on the first rotary member 3 and training the second screen mold 5 on the first and second rotary members 3, 4 of the film patterning system of the present invention, the aforesaid drawbacks associated with the prior art can be eliminated.

With the invention thus explained, it is apparent that various modifications and variations can be made without departing from the spirit of the pre sent invention. It is therefore intended that the invention be limited only as recited in the appended claims.

What is claimed is:

1. A film patterning system for patterning a film, comprising:
   a first rotary member having a first shaft that defines a first axis, and a cylindrical first screen mold that surrounds and that is coupled to said first shaft and that is rotatable about said first axis;
   a second rotary member spaced apart from said first rotary member, having a second shaft that defines a second axis parallel to said first axis, and rotatable about said second axis;
   a second screen mold trained on said first and second rotary members and circumferentially stacked on said first screen mold; and
   a suctioning box mounted in said first rotary member between said first shaft and said first screen mold for suctioning the film that is guided onto said second screen mold, thereby permitting the film to be patterned at least by said second screen mold.

2. The film patterning system of claim 1, further comprising a heater disposed adjacent to said first rotary member for heating the film that is guided onto said second screen mold.

3. The film patterning system of claim 1, wherein each of said first and second screen molds is made from metal and is seamless.

4. The film patterning system of claim 1, wherein said first and second rotary members are adjustable in relative position such that the distance between said first and second axes is adjustable.

5. The film patterning system of claim 1, wherein said second rotary member further has a cylindrical third screen mold that surrounds and that is coupled to said second shaft and that is rotatable about said second axis, said second screen mold being circumferentially stacked on said third screen mold.

6. The film patterning system of claim 5, further comprising a second suctioning box mounted in said second rotary member between said second shaft and said third screen mold.

7. The film patterning system of claim 6, further comprising a heater disposed adjacent to said second rotary member.

* * * * *